Sept. 26, 1967    P. STAMBERGER ET AL    3,343,556
VEHICLE PROTECTIVE COVER
Filed Aug. 23, 1965
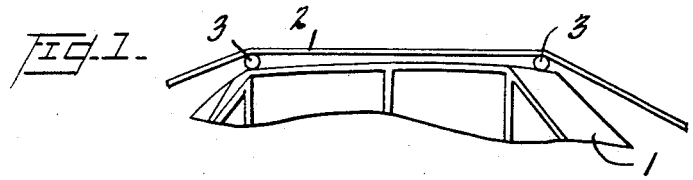
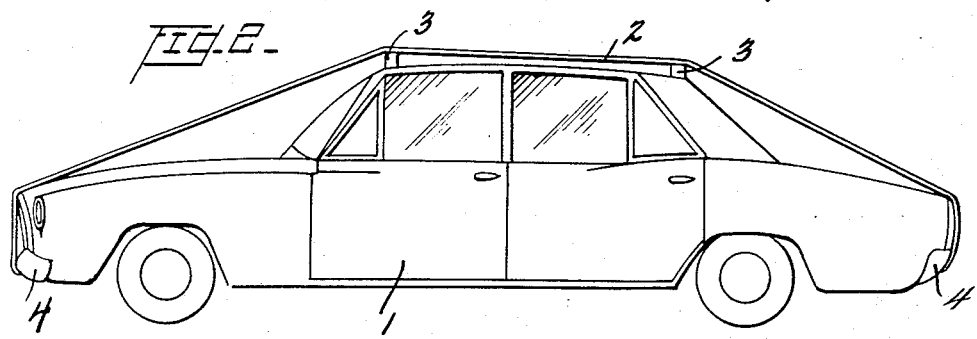
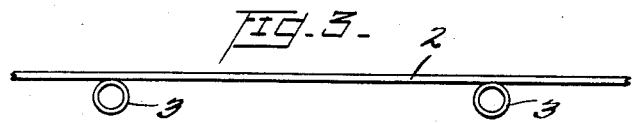
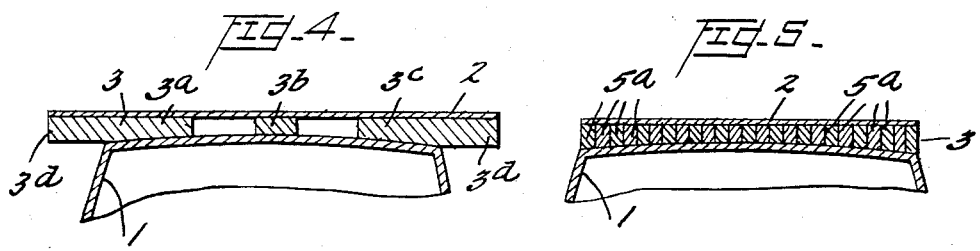
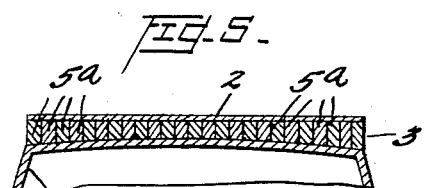
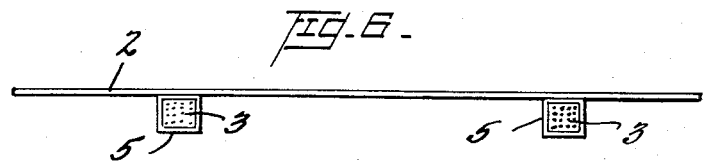
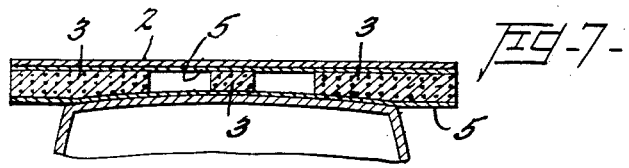
INVENTORS
Paul Stamberger
Arthur Nolan,
BY Smith, Michael, Bradford & Gardiner,
ATTORNEYS

United States Patent Office 3,343,556
Patented Sept. 26, 1967

3,343,556
VEHICLE PROTECTIVE COVER
Paul Stamberger, 552 W. University Parkway, Baltimore, Md. 21210, and Arthur Nolan, Rte. 3, Box 401, Annapolis, Md. 21403
Filed Aug. 23, 1965, Ser. No. 481,544
5 Claims. (Cl. 135—5)

ABSTRACT OF THE DISCLOSURE

The important and essential features of the present invention reside in the provision of a flexible cover or canopy for the roof portion of a motor car to provide against sun, rain, snow and/or sleet; which overlies the said roof in substantially parallel and in spaced relation to form between said roof and cover or canopy an air gap of appreciable height to permit circulation of air by convection therebetween; which does not, as distinguished from many of the prior art covers or canopies for motor cars, require the use of spacers or the like attached to the roof of the motor car; and which may be readily folded longitudinally and transversely into a small bundle so that the same, when not in use, may be stored in the trunk or other portion of the motor car.

---

This invention relates to a protective cover or canopy for motor cars, which provides protection from sun and rain and which may be folded and readily stored in the car itself.

Protective covers or canopies for the same purpose have been previously proposed, as is evidenced, for example, by U.S. Patent No. 2,405,348 and numerous others. However, the manner in which these prior art covers were applied on the motor roof of the car was cumbersome and required separate, rather involved attachments to be fastened on the roof or body of the motor car.

The object of the present invention is the provision of a device which requires a much simpler method for installation and which, after removal may be readily stored in a folded condition in the trunk compartment of the motor car. When using the device of the present invention, no spacers or other devices need be attached to the roof of the motor car to maintain the cover or canopy in substantially parallel, spaced relation overlying said roof structure.

The device in the present invention comprises a flexible sheet suitable to shield or shade the car, such as canvas, coated light weight fabric, plastic sheeting or the like, provided with a reflecting metallized surface. This cover is supported several inches above the roof of the car by spacers attached to and forming a part of the cover, to provide an air gap between the roof of the motor car and the cover which will act as an additional insulator and will enhance the cooling effect of the cover, the air currents under the cover being continuously replaced by cooler air due to convection.

According to the present invention, the spacers attached to the underside of the protective car cover will support the cover over the car roof at the desired distance when it is unrolled and installed above the car body.

In the following description and in the claims, the supports for the cover to provide an air gap will be referred to as spacers. The object, features, and advantages of this novel device will be apparent from the following description and appended claims, reference being made to the accompanying drawing, forming part of the specification, wherein like reference numerals designate corresponding parts in the several views.

FIGURE 1 in the drawing is a fragmentary, longitudinal side view of the upper portion of a motor car body over which the spacers and the cover are applied. FIGURE 2 is a longitudinal side view of a motor car with the cover and spacers applied over it by fastening the ends of the corner to the front and rear bumpers of the car. FIGURE 3 is a longitudinal side view of a portion of the cover showing a pair of longitudinally-spaced, transversely-disposed spacer elements attached to the underside of the cover member. FIGURE 4 is a fragmentary transverse sectional view of the upper portion of a motor car body together with one of the attached spacers and cover resting thereon. FIGURE 5 is a transverse sectional view of a different embodiment of the spacers shown in FIGURE 4. FIGURES 6 and 7 are, respectively, a longitudinal side view and a transverse sectional view showing the placement of spacers in pockets attached to the underside of the cover.

The numeral 1 in the drawing designates the car body; 2 the protective cover; 3 the spacers; 4 the bumper, and 5 the pockets.

FIGURE 3 shows the supporting spacers 3 arranged to lie transversely on the front and rear end portions of the roof of the car body. FIGURE 4 shows spacers 3 arranged in transversely-spaced sections 3a, 3b and 3c to facilitate bending of the cover and spacers to reduce the width of the folded cover and spacers for easy storage. The spacers 3 can be used either as a single piece which extends over the whole transverse width of the roof of the car body or can be subdivided transversely into a suitable number of separate, transversely-spaced sections.

Generally, one of the spacers 3 is placed adjacent the front portion and one adjacent the rear portion of the car roof but one of said spacers 3 may be placed adjacent the middle of the car roof. The spacers 3 as shown in FIGURE 4 may extend transversely beyond the sides of the car body as indicated at 3d, to support a cover of greater width than the car body itself to shade the inside of the car from the sun rays.

As shown in the drawings, the spacers 3 serve to support the cover 2, which cover is stretched above the roof of the motor car thus providing an air gap between the said roof and cover 2. The distance of the cover above the car roof is preferably 2–8 inches which distance is determined by the height of each spacer 3. The supporting spacers 3 are attached to the underside of the cover permanently or may be placed in suitable pockets 5 formed on the underside of the cover 2. The spacers 3 are made preferably from elastic material which is to some degree compressible, so as not to scratch the roof's surface, and is preferably of non-slip type and, hence, will not slip or slide along the roof's surface, especially when compressed as the cover is pulled or drawn tightly over the top of the car body 1 and is secured to the front and rear bumpers 4 of the motor car. It may be said that the spacers 3 and cover 2 constitute a unitary device when said spacers are attached to the undersurface of said cover by means of a suitable adhesive or attaching means or are disposed within pockets 5 formed on the undersurface of the said cover. The spacers 3 may be of integral construction or may consist of two or more transversely-spaced sections such as shown in FIGURE 5, connected by the cover or canopy 2, to facilitate folding thereof and may be of circular, square, rectangular or of any desired transverse cross section or configuration. Suitable materials for use in the manufacture of the spacers are: cellular rubber or plastics, inflatable, hollow, cylindrical or rectangular bodies, permanently inflated hollow bodies, and hollow bodies with sufficient wall thickness to withstand compression without collapsing.

FIGURE 5 shows another embodiment of this invention in which the spacer or spacers are composed of a plurality of transversely aligned blocks 5a arranged in side-by-side relation, with the upper surface of each block 5a secured to the underside of the cover or canopy 2. The adjacent side surfaces of said blocks 5a may be secured to each other to form an integral unit, but, preferably, they are not interconnected to thus permit the spacer 3 composed of said plurality of blocks 5a to flex, which facilitates the folding of the cover or canopy. It is also within the contemplation of the present invention that the individual blocks 5a be attached to the undersurface of cover or canopy 2 in transversely spaced relation and that they be disposed at any desired angle with respect to the said cover or canopy.

According to the present invention, the spacers 3 and the flexible sheet cover 2 form a unitary device. The cover when unfolded and placed over the car body, and having its front and rear ends secured to the front and rear bumpers 4, respectively, forms a canopy which is safe, well anchored and easily removable. This unitary device can then be removed from the car body, be folded up as one unit and placed for storage in the trunk compartment of the car for reuse.

The protective cover which may be fastened by clamps or other suitable forms of fasteners to the front and rear of the car body, is kept under additional tension by the elastic, compressible spacers 3, is maintained in substantially parallel relation with respect to the top of the roof of the motor car, will maintain its proper position, and will not be blown off by winds of normal intensity.

To cover the sides of the car body, additional curtains can also be provided to be attached to the car body or to the side edges of the protective cover itself. Leaving the air gap between the roof and cover open for air circulation prevents moisture, which initiates corrosion, from accumulating between the car roof and the cover.

What is claimed is:

1. A protective cover for a motor car adapted to be placed over the top portion thereof to protect the same from sun, sleet, snow and rain, comprising a sheet of flexible, impervious material overlying at least said top portion; transversely-extending, longitudinally-spaced spacer elements secured to the underside of said cover and adapted to rest on said top portion, said spacer elements being of substantial height to maintain said cover in substantially parallel spaced relation above and with respect to said top portion to form an air space of substantial height to permit circulation of air between said cover and said top portion, each spacer comprising a plurality of blocks arranged in an aligned row and extending in a direction transverse to the length of said top portion and each block having its top surface secured to the underside of said cover; and means for attaching the front and rear ends of said cover to the front and rear portions, respectively, of said motor car.

2. A protective cover as defined in claim 1 in which the blocks are each composed of flexible material.

3. A protective cover as defined in claim 1 in which the blocks are each composed of flexible cellular material.

4. A protective cover as defined in claim 1 in which the blocks are each composed of flexible inflatable material.

5. A protective cover as defined in claim 1 in which the blocks each consist of a hollow body of sufficient wall thickness to withstand compression without collapsing.

References Cited

UNITED STATES PATENTS

| 1,912,231 | 5/1933 | Wandscheer | 160—23 |
| 2,558,722 | 7/1951 | Almoslino | 182—163 |
| 2,751,977 | 6/1956 | Pinkerton | 160—368 |

FOREIGN PATENTS

| 1,104,920 | 6/1955 | France. |
| 1,321,203 | 2/1963 | France. |
| 545,218 | 6/1956 | Italy. |

REINALDO P. MACHADO, *Primary Examiner.*